(12) United States Patent
Li (10) Patent No.: US 11,124,255 B2
(45) Date of Patent: Sep. 21, 2021

(54) SADDLE SYSTEM AND BICYCLE

(71) Applicant: Wenjun Li, Heilongjiang (CN)

(72) Inventor: Wenjun Li, Heilongjiang (CN)

(73) Assignee: Wenjun Li, Heilongjiang (CN)

( * ) Notice: Subject to any disclaimer, the term of this patent is extended or adjusted under 35 U.S.C. 154(b) by 71 days.

(21) Appl. No.: 16/465,580

(22) PCT Filed: Nov. 21, 2017

(86) PCT No.: PCT/CN2017/112107
§ 371 (c)(1),
(2) Date: May 31, 2019

(87) PCT Pub. No.: WO2018/099298
PCT Pub. Date: Jun. 7, 2018

(65) Prior Publication Data
US 2019/0308682 A1     Oct. 10, 2019

(30) Foreign Application Priority Data

| Dec. 1, 2016 | (CN) | .......................... 201621311862.7 |
| Dec. 1, 2016 | (CN) | .......................... 201621311863.1 |
| Dec. 1, 2016 | (CN) | .......................... 201621311864.6 |

(51) Int. Cl.
*B62J 1/08* (2006.01)
*B62J 1/10* (2006.01)

(52) U.S. Cl.
CPC . *B62J 1/08* (2013.01); *B62J 1/10* (2013.01); *B62J 2001/085* (2013.01)

(58) Field of Classification Search
CPC ................. B62J 1/08; B62J 1/04; B62J 1/007
See application file for complete search history.

(56) References Cited

U.S. PATENT DOCUMENTS

| 605,151 | A | * | 6/1898 | Twist | ........................ B62J 1/002 |
| | | | | | 297/202 |
| 619,768 | A | * | 2/1899 | Lewis, Jr. | .............. A47C 7/024 |
| | | | | | 297/312 |

(Continued)

FOREIGN PATENT DOCUMENTS

| CN | 2806271 Y | 8/2006 |
| CN | 106741353 A | 5/2017 |

(Continued)

OTHER PUBLICATIONS

EP search report dated Dec. 14, 2020 in European application No. 17875876.9.

*Primary Examiner* — Timothy J Brindley
(74) *Attorney, Agent, or Firm* — Gang Yu (57) ABSTRACT

Provided is a saddle system and a bicycle, wherein the saddle system comprises a follower device, and the follower device is arranged on the seat rod of the bicycle for mounting the saddle. The follower device comprises a left and right rotating assembly and a left and right turnover assembly which are interconnected, wherein the left and right rotating assembly is rotated leftward or rightward with respect to the left and right turnover assembly, so that the saddle rotates leftward or rightward with respect to the seat rod. The left and right turnover assembly is turned over leftward or rightward with respect to the left and right rotating assembly to make the saddle is turned over leftward or rightward with respect to the seat rod.

19 Claims, 7 Drawing Sheets

(56) References Cited

U.S. PATENT DOCUMENTS

| | | | |
|---|---|---|---|
| 4,877,286 A | 10/1989 | Hobson et al. | |
| 5,387,025 A | 2/1995 | Denisar | |
| 5,911,474 A * | 6/1999 | Lee | B62J 1/005 |
| | | | 297/201 |
| 5,988,740 A * | 11/1999 | Caraballo | B62J 1/002 |
| | | | 297/201 |
| 6,056,356 A * | 5/2000 | Unger, Jr. | B62J 1/002 |
| | | | 297/195.1 |
| 6,079,774 A | 6/2000 | Proust | |
| 6,116,683 A | 9/2000 | Maier | |
| 6,402,235 B1 * | 6/2002 | Letendre | B62J 1/005 |
| | | | 297/195.1 |
| 6,761,400 B2 * | 7/2004 | Hobson | B62J 1/005 |
| | | | 297/195.1 |
| 6,786,542 B1 * | 9/2004 | Nuzzarello | B62J 1/005 |
| | | | 297/195.1 |
| 7,494,181 B2 * | 2/2009 | Tucker | B62J 1/005 |
| | | | 248/298.1 |
| 2004/0239157 A1 * | 12/2004 | Catling | B62J 1/005 |
| | | | 297/201 |
| 2005/0093348 A1 | 5/2005 | Heady | |
| 2014/0132047 A1 * | 5/2014 | Eldredge | B62J 1/005 |
| | | | 297/201 |
| 2017/0355409 A1 * | 12/2017 | Deiana | B62J 1/002 |

FOREIGN PATENT DOCUMENTS

| | | | | |
|---|---|---|---|---|
| CN | 206288127 U | | 6/2017 | |
| CN | 206288128 U | | 6/2017 | |
| CN | 206288129 U | | 6/2017 | |
| DE | 827008 C | * | 1/1952 | ............... B62J 1/002 |
| DE | 20100412 U1 | | 7/2001 | |
| DE | 20215136 U1 | | 3/2003 | |
| DE | 102015122778 A1 | * | 6/2017 | ......... A63B 22/0046 |
| GB | 2524471 A | | 9/2015 | |
| WO | 2009029115 A1 | | 3/2009 | |

* cited by examiner

SADDLE SYSTEM AND BICYCLE

TECHNICAL FIELD

The present disclosure relates to a technical field of bicycles, and in particular, to a saddle system and a bicycle.

BACKGROUND

Bicycle movement is an easily assigned movement project, and many riders often sit on the saddle for a long time to ride.

The traditional saddle is fixedly mounted on a vehicle frame, and there are mainly two completed function: In the first case, supporting the body weight of the rider; In the second case, cooperating the stepping schedule of the riding, so as to make the hip complete the rotating formed by the front and rear movement and the left and right movement of the center of gravity on the saddle. In addition, existing saddle areas are generally small, typically triangular. When using the saddle described above in riding, the hip can only rotate around the saddle and the hip will frictionally compress against the saddle. If it rides for a long time, the hip may be damaged.

In order to solve the above problems, some saddle rotatable bicycles appear. The purpose thereof is to allow a rider to ride, and the saddle can rotate follow the hip to reduce friction of the saddle to the hip, thereby reducing injury of the saddle to the hip due to friction. However, the above saddle can rotate basically only in one degree of freedom, however, the hip of the rider during riding is not simply moved in one degree of freedom, so the aforementioned rotatable saddle cannot completely motion follow the hip of the rider, and makes the friction with the hip of the rider.

SUMMARY

Some embodiments of the present disclosure is to provide a saddle system and a bicycle, so as to solve the problem in the related art that a long-time riding bicycle may injure a hip of a rider.

In order to achieve the above object, according to one aspect of the present disclosure, a saddle system is provided, which includes a follower device, which is arranged on a seat rod of a bicycle for mounting a saddle, and the follower device includes a left and right rotating assembly and a left and right turnover assembly which are interconnected. The left and right rotating assembly is rotated leftward or rightward with respect to the left and right turnover assembly, so that the saddle rotates leftward or rightward with respect to the seat rod, and the left and right turnover assembly is turned over leftward or rightward with respect to the left and right rotating assembly, so that the saddle is turned over leftward or rightward with respect to the seat rod.

In an exemplary embodiment, the saddle system further includes the saddle, the saddle being mounted on the follower device, and the left and right sides of the saddle being respectively provided with a thigh avoidance part.

In an exemplary embodiment, a side of the saddle is provided with an avoidance portion for avoiding a private part.

In an exemplary embodiment, the left and right rotating assembly is mounted on the seat rod of the bicycle, and the left and right turnover assembly is mounted on the left and right rotating assembly, and the saddle is mounted on the left and right turnover assembly.

In an exemplary embodiment, the left and right rotating assembly includes a mounting part and a rotating part, wherein the mounting part is fixedly arranged on the seat rod, the rotating part may be rotatablely mounted on the mounting part leftward or rightward, and the left and right turnover assembly is mounted on the rotating part.

In an exemplary embodiment, the left and right turnover assembly includes a connecting part and a turnover part, the connecting part is provided on the rotating part, the turnover part is turned over leftward or rightward and mounted on the connecting part, and the saddle is fixedly connected with the turnover part.

In an exemplary embodiment, the left and right rotating assembly further includes a first elastic return member, and the first elastic return member is mounted between the rotating part and the mounting part.

In an exemplary embodiment, the left and right turnover assembly further includes a second elastic return member, and the second elastic return member is mounted between the connecting part and the turnover part.

In an exemplary embodiment, wherein the rotating part includes a vertical rod and a transverse rod which are connected with each other, wherein the vertical rod is rotatablely mounted on the mounting part, and the left and right turnover assembly is mounted on the transverse rod.

In an exemplary embodiment, the transverse rod is movable forward or backward relative to the vertical rod so as to adjust a position of the saddle.

In an exemplary embodiment, an elevation of the transverse rod is adjustably disposed relative to the vertical rod.

In an exemplary embodiment, the rotating part further includes a locking connecting member, wherein the locking connecting member is connected between the transverse rod and the vertical rod, and a transverse groove is provided on the transverse rod, wherein the locking connecting member includes a first connecting portion cooperating with the transverse groove; wherein the locking connecting member is provided with a locking state in which the first connecting portion is locked in the transverse groove and an unlocking state in which the first connecting part is allowed to slide with respect to the transverse groove.

In an exemplary embodiment, an elevation adjusting portion is provided on the vertical rod, and the locking connecting member further includes a second connecting portion cooperating with the elevation adjusting portion, wherein the locking connecting part adjusts a position of the second connecting portion relative to the elevation adjusting portion to adjust the elevation of the transverse rod, the locking connecting member further locks the second connecting portion on the elevation adjusting portion in the locking state, and the locking connecting member further allows the second connecting portion to move relative to the elevation adjusting portion in the unlocking state.

In an exemplary embodiment, the connecting part is turnover-forwardly mounted on the rotating part.

In an exemplary embodiment, the rotating part is provided with an accommodating seat, wherein the connecting part is rotatablely mounted in the accommodating seat with respect to the accommodating seat, and the connecting part is connected to a middle front portion of the accommodating seat through a hinge shaft.

In an exemplary embodiment, the left and right turnover assembly is used for mounting on a seat tube of a bicycle, wherein the left and right turnover assembly is turned over leftward or rightward with respect to the seat tube, and the left and right turning assembly is mounted on the left and right turnover assembly, and the left and right rotating assembly is rotated leftward or rightward with respect to the left and right turnover assembly, and a mounting portion for mounting the saddle is formed on a top of the left and right rotating assembly.

In an exemplary embodiment, the left and right turnover assembly includes: a connecting part for mounting on the seat tube; a turnover part mounted on the connecting part, wherein the turnover part is turned over leftward or rightward with respect to the connecting part, and the left and right rotating assembly is mounted on the turnover part.

In an exemplary embodiment, the left and right turnover assembly further includes a turnover transmission part, wherein the turnover transmission part is mounted between the connecting part and the turnover part.

In an exemplary embodiment, the left and right rotating assembly includes a rotating part and a rotating transmission part, wherein the rotating part is provided on the turnover part and is rotated leftward or rightward with respect to the turnover part, the rotating transmission part is provided between the rotating part and the turnover part, the mounting portion is formed at a top of the rotating part.

In an exemplary embodiment, the left and right turnover assembly further includes a third elastic return member, wherein the third elastic return member is mounted between the connecting part and the turnover part.

In an exemplary embodiment, the left and right rotating assembly further includes a fourth elastic return member, wherein the fourth elastic return member is mounted between the rotating member and the turnover member.

In order to achieve the above object, according to another aspect of the present disclosure, there is provided a bicycle, comprising a saddle system, wherein the saddle system is the saddle system described above.

By applying the technical solutions of the present disclosure, when a rider rides, the saddle system can be applied to a bicycle. The follower device is arranged on the seat rod of the bicycle, and then the saddle is mounted on the follower device. Through the left and right rotating assembly, the saddle is rotated leftward or rightward relative to the seat rod, and then the saddle is turned over leftward or rightward relative to the seat rod by the left and right turnover assembly. In this way, the saddle system of the present embodiment enables the saddle to complete a composite movement of rotation and turnover with the hip of the rider completely, thereby ensuring that the saddle system moves following the hip of the rider completely, reducing friction between the hip and the saddle, and further avoiding damage to the hip of the rider by riding a bicycle fora long time.

In addition to the objects, features and advantages described above, the present disclosure also has other objects, features and advantages. Hereinafter, the present disclosure will be further described in detail with reference to the drawings.

BRIEF DESCRIPTION OF THE DRAWINGS

A part of drawings of the disclosure are provided to further understand the disclosure, and schematic embodiments and description are adopted not to limit the disclosure but only to explain the disclosure. In the drawings.

Herein, the drawings include the following drawing markers:

10, left and right rotating assembly; 11, mounting part; 12, rotating part; 13, rotating transmission part; 121, vertical rod; 122, transverse rod; 123, locking connecting part; 1211, elevation adjusting portion; 1221, transverse groove; 20, left and right turnover assembly; 21, connecting part; 22, turnover part; 23, turnover transmission part; 30, saddle; 31, thigh avoidance part; 32, avoidance part for avoiding a private part; 40, seat rod; 41, hairspring; 42, spring; 43, spring mounting groove; 44, cooperate protrusion.

DETAILED DESCRIPTION OF THE EMBODIMENTS

It needs be noted that the embodiments and the features of the embodiments of the present disclosure may be combined with each other without confliction. Hereinafter, the present disclosure will be described in detail with reference to the drawings and embodiments.

In order to make those skilled in the art better understand the technical solutions of the present disclosure, the technical solutions in the embodiments of the present disclosure will be clearly and completely described below with reference to the drawings in the embodiments of the present disclosure. Apparently, the described embodiments are merely a part of the embodiments of the present disclosure, rather than all of the embodiments. Based on the embodiments of the present disclosure, all other embodiments obtained by those skilled in the art without creative efforts shall belong to the scope of protection of the present disclosure.

It needs be noted that the appearances of front, rear, left, and right in the text refer to front, rear, left, and right relative to the bicycle during the travel of the bicycle.

Figure 1:
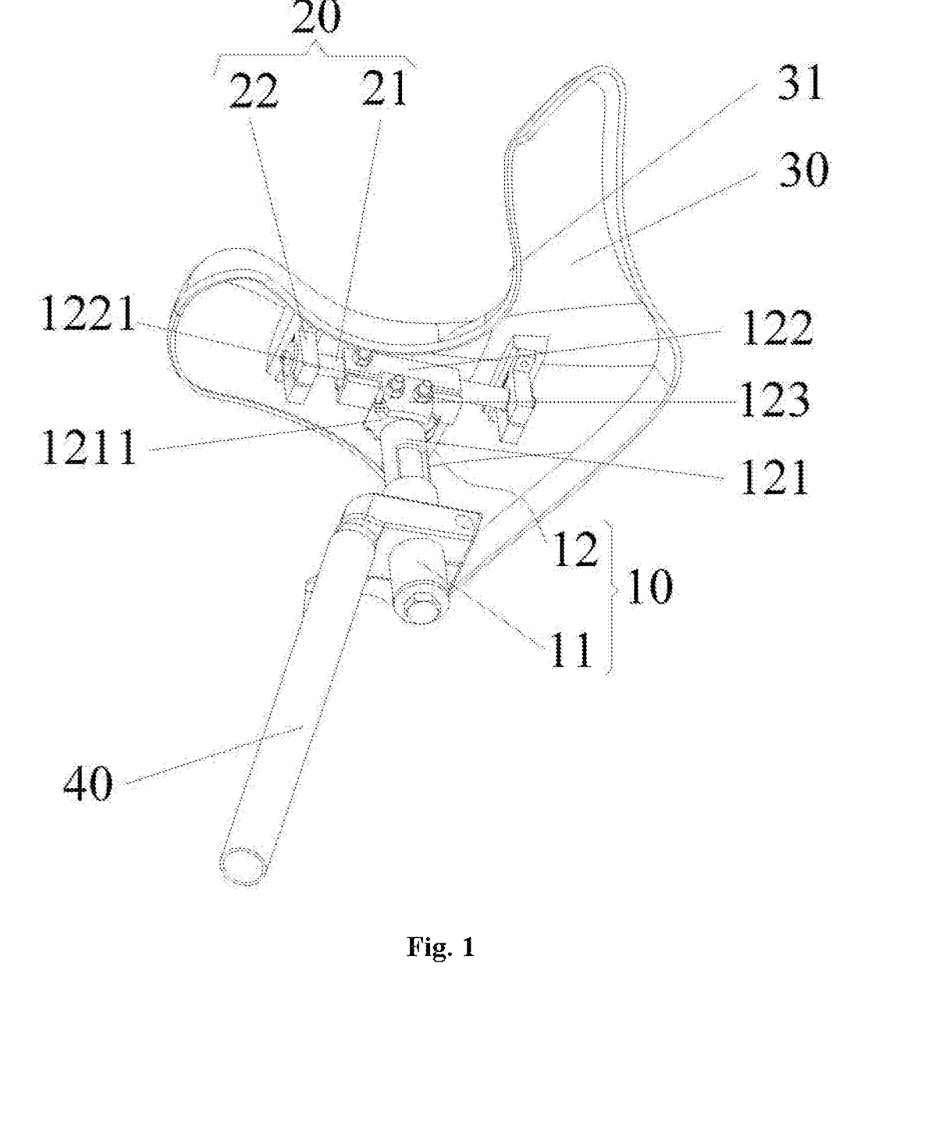
FIG. 1 illustrates an overall schematic diagram of a first embodiment of a saddle system according to the present disclosure.

FIG. 1 illustrates a saddle system of embodiment 1, the saddle system includes a follower device arranged on a seat bar 40 of a bicycle for mounting a saddle 30. The follower device includes a left and right rotating assembly 10 and a left and right turnover assembly 20 which are interconnected, and the left and right rotating assembly 10 is rotated leftward or rightward with respect to the left and right turnover assembly 20, so that the saddle 30 rotates leftward or rightward with respect to the seat rod 40. The left and right turnover assembly 20 is turned over leftward or rightward with respect to left and right rotating assembly 10, so that the saddle 30 is turned over leftward or rightward with respect to seat rod 40.

When a rider rides, the saddle system may be applied to the bicycle. The follower device is arranged on the seat rod 40 of the bicycle, and then the saddle 30 is mounted on the follower device. When the rider rides, if a right foot of the rider pedals a pedal, and a hip of the rider may be inclined to the right involuntarily. Since it is necessary that the rider's foot is extended forward when the rider pedals the pedal, so as to complete a circle movement of the pedal, the hip will rotate rightward involuntarily. Therefore the hip of the rider will eventually perform a composite movement of right inclination and right rotation. Through the left and right rotating assembly 10, the saddle 30 may be rotated leftward or rightward relative to the seat rod 40, and then the saddle 30 may be turned over leftward or rightward relative to the seat rod 40 by the left and right turnover assembly 20. In this way, the saddle system of embodiment 1 enables the saddle 30 to complete a composite movement of rotation and turnover with the hip of the rider, thereby ensuring that the saddle system can move following with the hip of the rider completely, reducing friction between the hip and the saddle 30, and further avoiding damage to the hip of the rider by riding a bicycle for a long time.

As shown in FIG. 1, in embodiment 1, the saddle system further includes a saddle 30, where the saddle 30 is mounted on the follower device, and the left and right sides of the saddle 30 are respectively provided with a thigh avoidance part 31. The thigh avoidance part 31 can avoid a friction between the thigh and the saddle 30, release the thighs of the rider, and leave the thighs thereof to be supported by the saddle 30, and make the saddle 30 move following with the movement of the hip. In addition, using said saddle 30 can reduce the friction between the hip and the saddle 30, thereby saving body energy and improving the riding rate.

Figure 6:
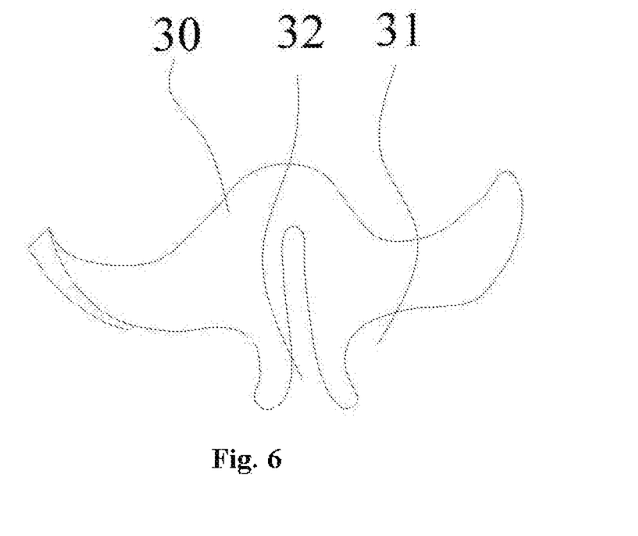
FIG. 6 illustrates a schematic diagram of another saddle of the saddle system of FIG. 1.

In a process of using the traditional saddle 30 for a long time, the support part at a front part of the traditional saddle 30 presses a perineum of a human body, thereby easily causing the perineum to be insufficient for blood supply and affecting the reproductive health. As shown in FIG. 6, the front side of the saddle 30 is provided with an avoidance part for avoiding a private part 32. In this way, it is possible to avoid the compression of the saddle 30 on the perineum of the human body, and ensure that the reproductive health of the rider is not affected by riding bicycle.

As shown in FIG. 1, in the first embodiment, the left and right rotating assembly 10 is mounted on the seat rod 40 of the bicycle, the left and right turnover assembly 20 is mounted on the left and right rotating assembly 10, and the saddle 30 is mounted on the left and right turnover assembly 20. In the embodiment not shown, it is also possible that the left and right turnover assembly 20 is mounted on the seat rod 40 of the bicycle, and then the left and right rotating assembly 10 is mounted on the left and right turnover assembly 20.

As shown in FIG. 1, in embodiment 1, the left and right rotating assembly 10 includes a mounting part 11 and a rotation part 12, where the mounting part 11 is fixedly disposed on the seat rod 40, the rotating part 12 may be rotatablely mounted on the mounting part 11 leftward or rightward, and the left and right turnover assembly 20 is mounted on the rotating part 12. In the first embodiment, the mounting part 11 is a sleeve that can be fixedly connected to the seat rod 40, and the rotating part 12 is a rod that can be inserted into the sleeve.

In an exemplary embodiment, the left and right rotating assembly 10 further includes a first elastic return member, and the first elastic return member is mounted between the rotating part 12 and the mounting part 11. The first elastic return member may help the rotating part 12 returns to an initial position of the rotating part 12, so as to help a rotating angle of the saddle 30 return to a central position of the bicycle. As shown in FIG. 1, a mounting groove for mounting the first elastic return member is provided on a rod member of the mounting part 11 or the rotating part 12, and the first elastic return member is mounted in the mounting groove. In a portion not shown in the drawing, a convex portion cooperating with the mounting groove and the first elastic return member is provided in the sleeve.

As shown in FIG. 1, the left and right turnover assembly 20 includes a connecting part 21 and a turnover part 22, the connecting part 21 is provided on the rotating part 12, the turnover part 22 is turned over leftward or rightward and mounted on the connecting part 21, and the saddle 30 is fixedly connected with the turnover part 22. In the first embodiment, the connecting part 21 and the rotating part 12 are two separate parts and are connected. In the embodiment not shown, the connecting part 21 and the rotating part 12 is an integral part. In an exemplary embodiment, the turnover part 22 is a bearing part cooperated with the connecting part 21.

In an exemplary embodiment, the left and right turnover assembly 20 further includes a second elastic return member, wherein the second elastic return member is mounted between the connecting part 21 and the turnover part 22. The second elastic return member may help the turnover part 22 return to an initial position of the turnover part 22, so as to help the saddle 30 return to a central position of the bicycle.

As shown in FIG. 1, the rotating part 12 includes a vertical rod 121 and a transverse rod 122, the vertical bar 121 is rotatablely mounted on the mounting part 11, and the left and right turnover assembly 20 is mounted on the transverse rod 122. Alternatively, the transverse rod 122 is movable forward or backward relative to the vertical rod 121, so as to adjust the front-rear position of the saddle 30 on the bicycle to accommodate the use of different riders.

In addition, an elevation of the transverse rod 122 is adjustably disposed relative to the vertical rod 121. The elevation of the saddle 30 is adjusted by, adjusting the elevation of the transverse rod 122 relative to the vertical rod 121, so as to bring a head of the saddle 30 upward or downward to apply to the use of different riders.

As shown in FIG. 1, in embodiment 1, the rotating part 12 further includes a locking connecting member 123 connected between the transverse rod 122 and the vertical rod 121. The transverse rod 122 is provided with a transverse groove 1221, and the locking connecting member 123 includes a first connecting portion cooperating with the transverse groove 1221. The locking connecting member 123 has a locking state in which the first connecting portion is locked in the transverse groove 1221 and an unlocking state in which the first connecting portion is allowed to slide relative to the transverse groove 1221. The transverse rod 122 can be conveniently adjusted to move forward or backward by the locking connecting member 123.

As shown in FIG. 1, an elevation adjusting portion 1211 is provided on the vertical rod 121, and the locking connecting member 123 further includes a second connecting member cooperating with the elevation adjusting portion 1211. The locking connector 123 adjusts a position of the second connecting portion relative to the elevation adjusting portion 1211 to adjust the elevation of the transverse rod 122, and the locking connector 123 locks the second connecting portion on the elevation adjusting portion 1211 in the locking state, and the locking connecting member 123 also allows the second connecting portion to move relative to the elevation adjusting portion 1211 in the unlocking state. In this way, the elevation of the transverse rod 122 can be conveniently adjusted by the locking connecting member 123 and then fixed. In an exemplary embodiment, the elevation adjusting part 1211 is an arc convex portion, and the second connecting portion is an arc clamping groove adapted to the arc convex portion.

Figure 2:
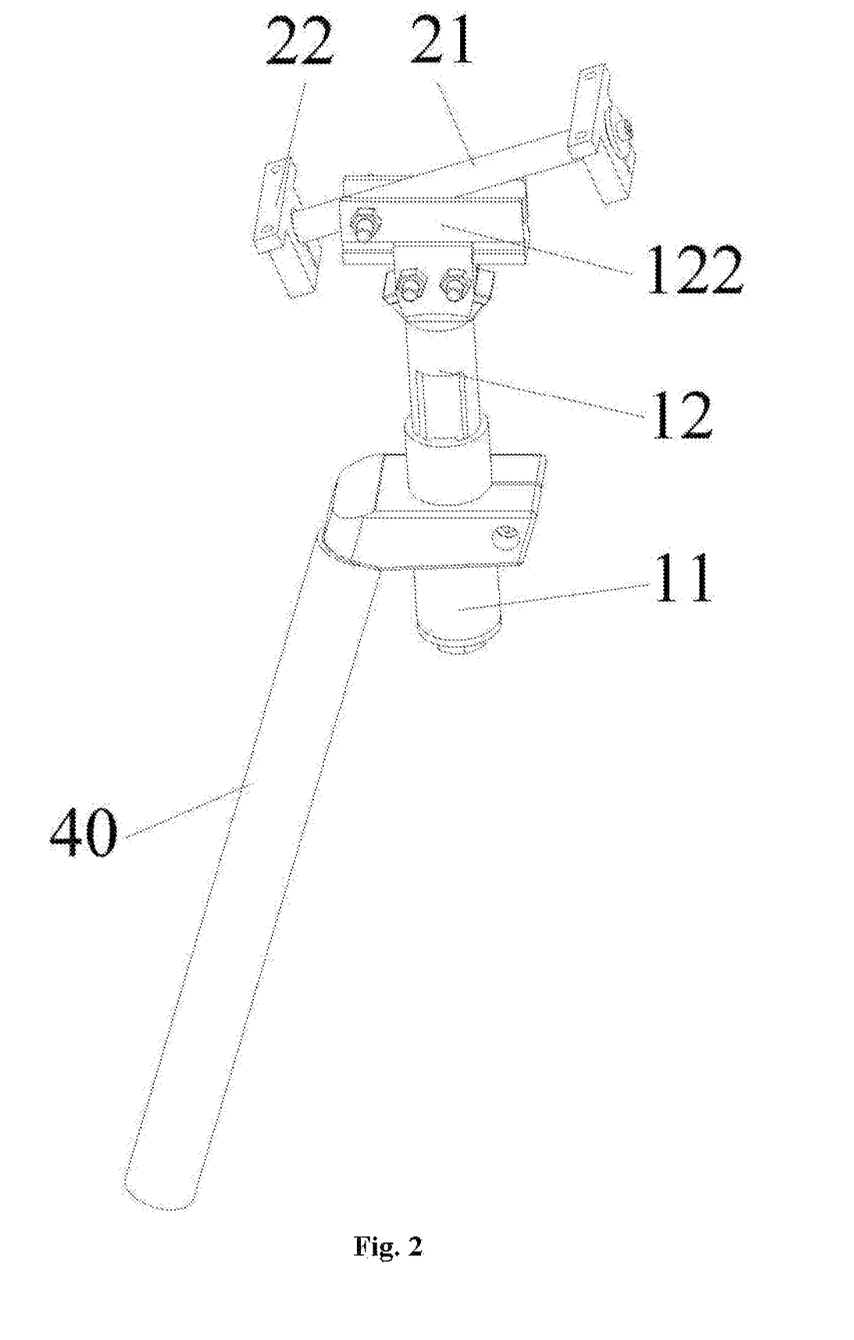
FIG. 2 illustrates a schematic diagram of another state of the partial structure of the saddle system of FIG. 1.

As shown in FIGS. 1 and 2, the connecting part 21 is turnover-forwardly mounted on the rotating part 12. In this way, when the bicycle is stopped and then the rider gets off, the saddle 30 can be turned over forward with the hip of the rider, thereby achieving the purpose that convenient for the rider to get off. In an exemplary embodiment, as shown in FIG. 2, in embodiment 1, an accommodating seat is provided on the rotating part 12, the connecting part 21 is rotatablely mounted in the accommodating seat with respect to the accommodating seat, and the connecting part 21 is connected to a middle front portion of the accommodating seat through a hinge shaft. During riding, the rider is sitting on the bicycle, so that no backward turnover will occur, and the saddle 30 can be turned over forward as long as the rider gets off, thereby facilitating getting off.

Figure 3:
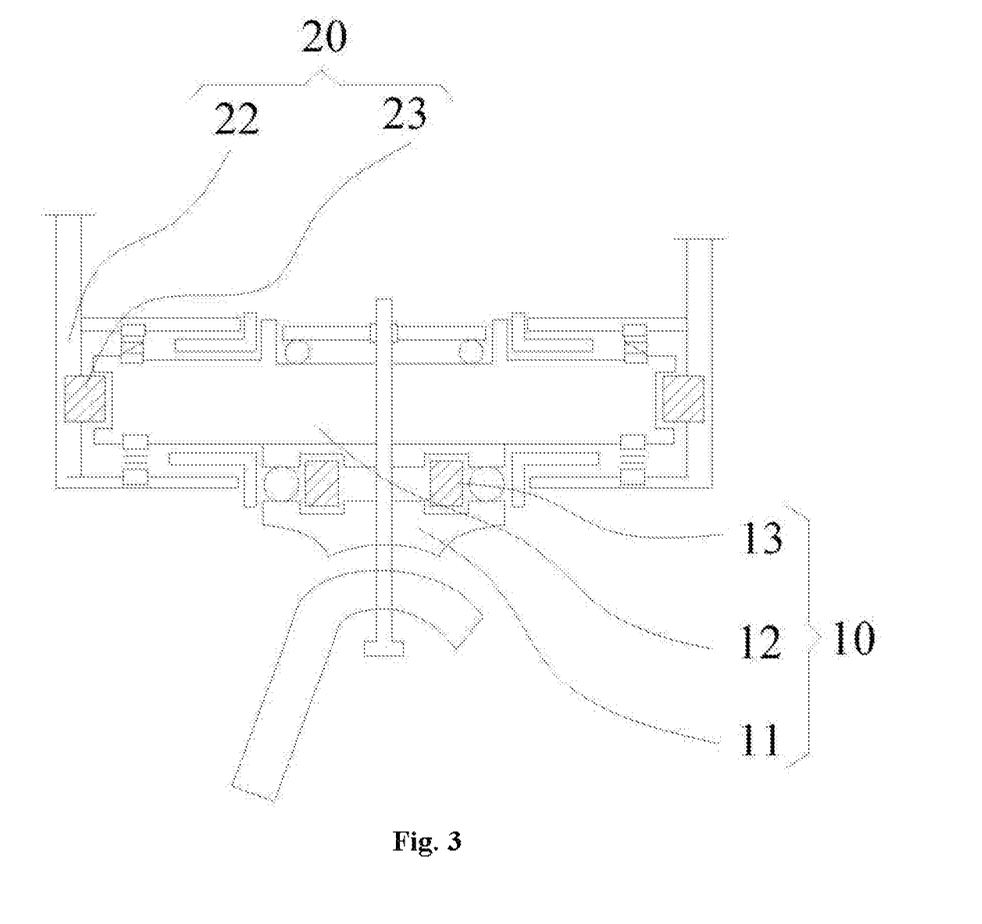
FIG. 3 illustrates an overall schematic diagram of a second embodiment of a saddle system according to the present disclosure.

As shown in FIG. 3, in the technical solution of the second embodiment, the left and right rotating assembly 10 includes a mounting part 11 and a rotating part 12. The mounting part 11 is for mounting on the seat tube, the rotating part 12 is mounted on the mounting part 11, and the rotating part 12 is rotatable relative to the mounting part 11, and the left and right turnover assembly 20 is mounted on the rotating part 12. In an exemplary embodiment, the left and right rotating assembly 10 further includes a rotating transmission part 13, and the rotating transmission part 13 is installed between the mounting part 11 and the seat tube. The provision of the rotating transmission part 13 can reduce the frictional force between the mounting part 11 and the rotating part 12, so as to make the rotation of the rotating part 12 more smooth. In addition, the left and right turnover assembly 20 includes a turnover part 22 and a turnover transmission part 23, a mounting portion is formed on the top of the turnover part 22, and the turnover part 22 is installed on the rotating part 12 with respect to the rotating part 12 turned over leftward or rightward, and the turnover transmission part 23 is installed between the turnover part 22 and the rotating part 12. The turnover transmission part 23 is also provided to reduce the frictional force between the connecting part 22 and the rotating part 12, so as to make the turnover part 22 rotate more smoothly.

As shown in FIG. 3, in the technical solution of embodiment 2, there are two turnover parts 22, and there are two turnover transmission parts 23; the two turnover parts 22 are respectively mounted at two ends of the rotating part 12; and the two turnover transmission parts 23 are respectively mounted between two turnover parts 22 and two ends of the rotating part 12. In an exemplary embodiment, the mounting part 11 is a rotating shaft, the rotating transmission part 13 is a thrust bearing, the rotating part 12 is mounted on the rotating shaft through the thrust bearing, and the two turnover parts 22 are respectively provided at two ends of the second rotating part in a sleeving manner. As shown in FIG. 3, the turnover transmission part 23 is also a thrust bearing. In use, the turnover part 22 is mounted at both ends of the rotating part 12 by the turnover transmission part 23, and the saddle is mounted on the mounting portions of the two turnover parts 22. In an exemplary embodiment, the turnover transmission part 23 is also a thrust bearing.

When the rider is in use, the rotating shaft is mounted on the seat tube of the bicycle, and the rotating part 12 is mounted on the rotating shaft through a thrust bearing. When the rider rides, the rotating part 12 can rotate leftward or rightward relative to the rotating shaft, and the rotating transmission part 13 can make the rotation of the rotating part 12 more smoothly; The turnover part 22 is turned over leftward or rightward relative to the rotating part 12, and the turnover transmission part 23 makes the turnover part 22 rotate more smoothly. In this way, the saddle can complete the composite movement of rotation and turnover with the hip of the rider; so as to ensure that the saddle system can move following the hip of the rider completely and reduce the friction between the hip and the saddle, thereby avoiding damage to the hip of the rider by riding the bicycle for a long time.

In an exemplary embodiment, in the technical solution of embodiment 2, the left and right rotating assembly 10 further includes a first elastic return member installed between the mounting part 11 and the rotating part 12. The first elastic return member can make the rotating part 12 returns to an initial position of the rotating part 12, so as to help the saddle return to the center position of the bicycle. In addition, the left and right turnover assembly 20 further includes a second elastic return member installed between the turnover part 22 and the rotating part 12. The second elastic return member can help the turnover part 22 return to an initial position of the turnover part 22, so as to help the saddle return to a central position of the bicycle. When the rider rides, the first elastic return member and the second elastic return member can automatically make the saddle after the saddle deviating from the central position of the bicycle return to an initial position of the saddle, which can help the hip of the rider to return to an initial position of the hip after rotation, thereby reducing the energy loss of the rider.

Figure 4:
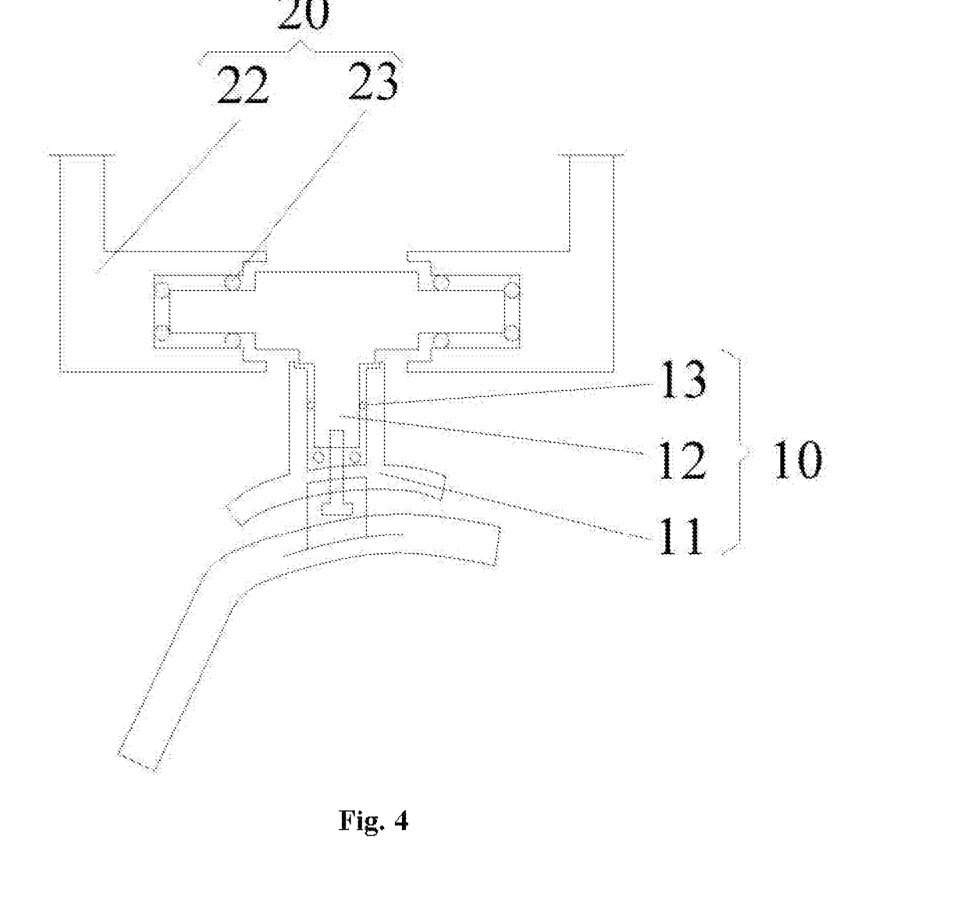
FIG. 4 illustrates an overall schematic diagram of a third embodiment of a saddle system according to the present disclosure.

FIG. 4 shows a third embodiment of a saddle system according to the present disclosure, the saddle system includes a follower device and a left and right turnover assembly 20, the follower device includes a left and right rotating assembly 10 for mounting on a seat tube of a bicycle, and the left and right rotating assembly 10 is rotated leftward or rightward relative to the seat tube. The left and right turnover assembly 20 is mounted on the left and right rotating assembly 10; the left and right turnover assembly 20 can be turned over leftward or rightward with respect to the left and right rotating assembly 10; and a mounting portion for mounting a saddle is formed on a top of the left and right turnover assembly 20. The left and right rotating assembly 10 includes a mounting part 11 and a rotating part 12. The mounting part 11 is for mounting on the seat tube, the rotating part 12 is mounted on the mounting part 11, and the rotating part 12 is rotatable relative to the mounting part 11, and the left and right turnover assembly 20 is mounted on the rotating part 12. In an exemplary embodiment, the left and right rotating assembly 10 further includes a rotating transmission part 13, and the rotating transmission part 13 is installed between the mounting part 11 and the seat tube. The left and right turnover assembly 20 includes a turnover part 22 and a turnover transmission part 23, in which the mounting portion is formed on a top of the turnover part 22, the turnover part 22 can be turned over leftward or rightward with respect to the rotating part 12 and mounted on the rotating part 12, and the turnover transmission part 23 is mounted between the turnover part 22 and the turnover part 12. The number of the turnover part 22 is two, the number of the turnover transmission part 23 is also two, the two turnover parts 22 are mounted at two ends of the rotating part 12 respectively, and the two turnover transmission parts 23 are mounted between two turnover parts 22 and two ends of the rotating part 12 respectively.

Compared with the technical solution of embodiment 3, the difference lies in that the mounting part 11 in embodiment 2 includes a base and a mounting sleeve, the base is used for fixedly connecting with the seat tube, the mounting sleeve is arranged on the base, and the rotating part 12 is of T-shaped, the rotating part 12 includes a vertical shaft and a transverse shaft which are interconnected. The vertical shaft is rotatablely mounted in the mounting sleeve, and the two turnover parts 22 are respectively provided at two ends of the rotating part 12 in a sleeving manner.

When the rider rides, the base is fixedly mounted on the seat tube of the bicycle, the turnover transmission part 23 is mounted in the mounting sleeve, and then the vertical shaft of the rotating part 12 is inserted into the mounting sleeve to cooperate with the turnover transmission part 23. Thereafter, the two turnover transmission parts 23 are mounted at both ends of the second rotating part, and the two turnover transmission parts 23 are provided at both ends of the second rotating part in a sleeving manner to cooperate with the turnover transmission parts 23.

When the rider rides, the rotating part 12 can rotate leftward or rightward relative to the mounting sleeve, and the rotating transmission part 13 can make the rotation of the rotating part 12 more smoothly; the turnover part 22 can be turned over leftward or rightward relative to the rotating part 12, and the turnover transmission part 23 can make rotation of the turnover part 22 more smoothly. In this way, the saddle can complete the composite movement of rotation and turnover with the hip of the riders, so as to ensure that the saddle system can move following the hip of the rider completely and reduce the friction between the hip and the saddle, thereby avoiding damage to the hip of the rider by riding the bicycle for a long time.

In the third embodiment, the left and right rotating assembly 10 further includes a first elastic return member installed between the mounting part 11 and the rotating part 12. The first elastic return member may make the rotating part 12 return to an initial position of the rotating part 12 to help the saddle return to the center position of the bicycle. In addition, the left and right turnover assembly 20 further includes a second elastic return member installed between the turnover part 22 and the rotating part 12. The second elastic return member may help the turnover part 22 return to an initial position of the rotating part 22 to help the saddle return to a central position of the bicycle. When the rider rides, the first elastic return member and the second elastic return member can automatically make the saddle return to an initial position of the saddle after deviating from the central position of the bicycle, which may help the hip of the rider to return to an initial, position of the hip after rotation, thereby reducing the energy loss of the rider.

Figure 5:
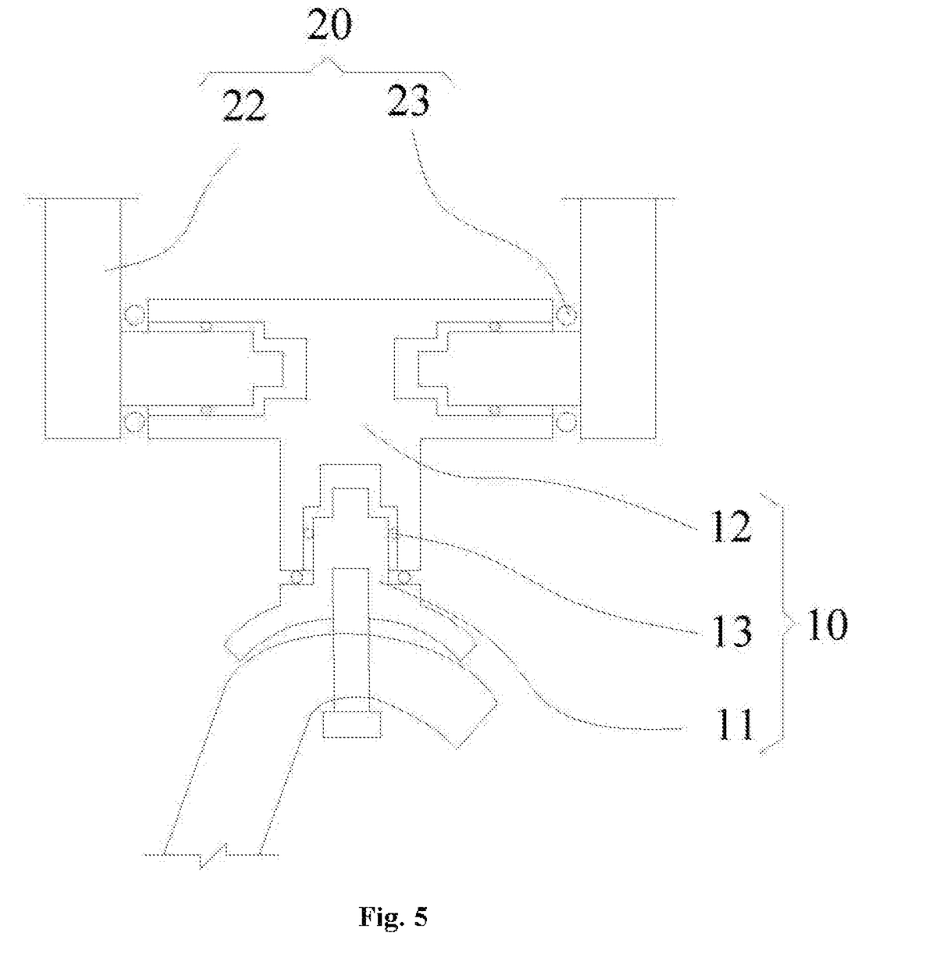
FIG. 5 illustrates an overall schematic diagram of a fourth, embodiment of a saddle system according to the present disclosure.

FIG. 5 illustrates a fourth embodiment of a saddle system according to the present disclosure, the saddle system includes a follower device, the follower device includes a left and right rotating assembly 10 for mounting on a seat tube of a bicycle, and the left and right rotating assembly 10 can be rotated leftward or rightward with respect to the seat tube. The follower device includes a left and right turnover assembly 20 mounted on the left and right rotating assembly 10; the left and right turnover assembly 20 can be turned over leftward or rightward with respect to the left and right rotating assembly 10; and a mounting portion for mounting a saddle is formed on a top of the left and right turnover assembly 20. The left and right rotating assembly 10 includes a mounting part 11 and a rotating part 12. The mounting part 11 is for mounting on the seat tube, the rotating part 12 is mounted on the mounting part 11, and the rotating part 12 is rotatable relative to the mounting part 11, and the left and right turnover assembly 20 is mounted on the rotating part 12. In an exemplary embodiment, the left and right rotating assembly 10 further includes a rotating transmission part 13, and the rotating transmission part 13 is installed between the mounting part 11 and the seat tube. The left and right turnover assembly 20 includes a turnover part 22 and a turnover transmission part 23, a mounting portion is formed on a top of the turnover part 22, the turnover part 22 can be turned leftward or rightward with respect to the rotating part 12 and mounted on the rotating part 12, and the turnover transmission part 23 is mounted between the turnover part 22 and the rotating part 12. The number of the turnover part 22 is two, the number of the turnover transmission part 23 is also two, the two turnover parts 22 are respectively mounted at two ends of the rotating part 12, and the two turnover transmission parts 23 are respectively mounted between two turnover parts 22 and two ends of the rotating part 12.

Compared with the technical solution of the second embodiment, the difference lies in that, in the fourth embodiment, the mounting part 11 includes a base and a mounting protrusion, the base is used for fixedly connecting with the base tube, and the mounting protrusion is provided on the base. The rotating part 12 is of T-shaped and includes a vertical shaft and a transverse shaft connected with the vertical shaft, and a bottom end of the vertical shaft forms a lower sleeve structure, the lower sleeve structure is provided on the mounting protrusion in a sleeving manner, and two ends of the transverse shaft respectively form a front sleeve structure and a rear sleeve structure, and the two turnover parts 22 are snap-fitted into the front sleeve structure and the rear sleeve structure respectively.

When the rider rides, the base is fixedly mounted on the seat tube of the bicycle, the turnover transmission part 23 is mounted on the mounting protrusion, and then the vertical shaft of the rotating part 12 is provided on the mounting protrusion in a sleeving manner and cooperates with the turnover transmission part 23. Thereafter, the two turnover transmission parts 23 are mounted in both ends of the transverse shaft of the rotating part 12, and the two turnover parts 22 are inserted into both ends of the transverse shaft of the rotating part 12 to cooperate with the turnover transmission parts 23.

When the rider rides, the rotating part 12 can rotate leftward or rightward with respect to the mounting protrusion, and the rotating transmission part 13 can make the rotation of the rotating part 12 more smoothly; the turnover part 22 can be turned over leftward or rightward relative to the rotating part 12, and the turnover transmission part 23 can make the rotation of the turnover part 22 more smoothly. In this way, the saddle can complete the composite movement of rotation and turnover with the hip of the riders, so as to ensure that the saddle system can move following the hip of the rider completely and reduce the friction between the hip and the saddle, thereby avoiding damage to the hip of the rider by riding the bicycle for a long time.

Figure 7:
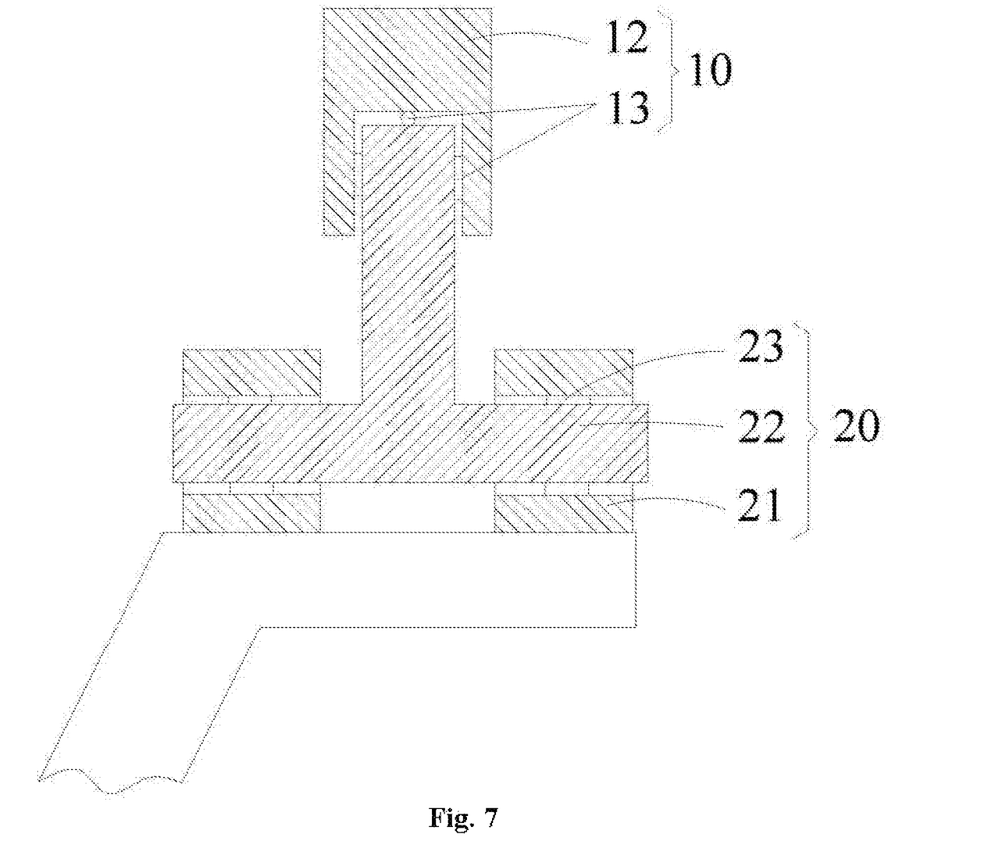
FIG. 7 illustrates an overall schematic diagram of a fifth embodiment of a saddle system according to the present disclosure.

As shown in FIG. 7, the seat system of the present disclosure further provides a fifth embodiment. In the saddle system of the fifth embodiment, the left and right turnover assembly 20 is mounted on a seat tube of the bicycle, and the left and right turnover assembly 20 can be turned over leftward or rightward with respect to the seat tube. The left and right rotating assembly 10 is mounted on the left and right turnover assembly 20, and the left and right rotating assembly 10 can be rotated leftward or rightward with respect to the left and right turnover assembly 20, and a mounting portion for mounting a saddle is formed on a top of the left and right rotating assembly 10. Through the left and right turnover assembly 20, the saddle can be turned over leftward or rightward relative to the seat tube, and then the left and right rotating assembly 10 can be used to make the saddle rotate leftward or rightward relative to the seat tube. In this way, the saddle system of embodiment 5 enables the saddle to complete a composite movement of rotation and turnover with the hip of the rider, thereby ensuring that the saddle system can move following the hip of the rider completely, reducing friction between the hip and the saddle, and thus avoiding damage to the hip of the rider by riding the bicycle for a long time.

In an exemplary embodiment, as shown in FIG. 7, in the fifth embodiment, the left and right turnover assembly 20 includes a connecting part 21 and a turnover part 22. The connecting part 21 is mounted on the seat tube; the turnover part 22 is mounted on the connecting part 21, and the turnover part 22 may be turned over leftward or rightward with respect to the connecting part 21, and the left and right rotating assembly 10 is mounted on the turnover part 22. In an exemplary embodiment, the connecting part 21 can be connected to the seat tube through a connecting part, or directly welded to the seat tube.

As shown in FIG. 7, in the fifth embodiment, the left and right turnover assembly 20 further include a turnover transmission part 23 installed between the connecting part 21 and the turnover part 22. The turnover transmission part 23 can reduce the frictional force between the connecting part 21 and the turnover part 22 to make the turnover part 22 rotate more smoothly.

As shown in FIG. 7, in the technical solution of the fifth embodiment, the left and right rotating assembly 10 includes a rotating part 12 and a rotating transmission part 13, the rotating part 12 is arranged on the turnover part 22 and can rotate leftward or rightward with respect to the turnover part 22. The rotating transmission part 13 is disposed between the rotating part 12 and the turnover part 22, and a mounting portion is formed at the top of the rotating part 12. The rotating transmission part 13 is also provided to reduce the frictional force between the rotating part 12 and the turnover part 22 to make the rotation of the rotating part 12 more smoothly.

In embodiment 5, the turnover part 22 is of T-shaped, and includes a transverse shaft and a longitudinal shaft connected thereto. The number of the connecting part 21 and the turnover transmission part 23 are both two, and the two connecting parts 21 are mounted on the seat tube at intervals. The two ends of the transverse shaft are respectively mounted on the two connecting parts 21 through two turnover transmission parts 23, and the rotating parts 12 are mounted on the free end of the longitudinal shaft through the rotating transmission parts 13.

In use, the two turnover transmission parts 23 are firstly mounted on the two connecting parts 21, and then the two ends of the transmission shaft of the turnover part 22 are mounted on the connecting parts 21 to cooperate with the turnover transmission parts 23. Thereafter, the rotating transmission part 13 is mounted on the free end of the longitudinal shaft of the turnover part 22, and finally the rotating part 12 is mounted on the turnover part 22 to cooperate with the rotating transmission part 13. In an exemplary embodiment, the connecting part 21 is a common bearing, and the turnover part 22 is a thrust bearing.

When the rider rides, the turnover part 22 can be turned over leftward or rightward with respect to the connecting part 21, and the connecting part 21 makes the rotation of the turnover part 22 more smoothly; The rotating part 12 can be rotated leftward or rightward relative to the turnover part 22, and the rotating transmission part 13 makes the rotation of the rotating part 12 more smoothly. In this way, the saddle can complete the composite movement of rotation and turnover with the hip of the rider, so as to ensure that the saddle system can move following the hip of the rider completely and reduce the friction between the hip and the saddle, thereby avoiding damage to the hip of the rider by riding the bicycle for a long time.

In an exemplary embodiment, in the technical solution of embodiment 5, the left and right turnover assembly 20 further includes a third elastic return member installed between the connecting part 21 and the turnover part 22. The third elastic return member can make the turnover part 22 return to an initial position of turnover part 22, so as to help the saddle turnover back to the center position of the bicycle. In addition, the left and right rotating assembly 10 further includes a fourth elastic return member mounted between the rotating part 12 and the rotating transmission part 13. The fourth elastic return member may help the rotating part 12 return to an initial position of the rotating part 12, so as to help the saddle rotate back to the center position of the bicycle. When the rider rides, the third elastic return member and the fourth elastic return member may automatically make the saddle return to an initial position of the saddle after deviating from the central position of the bicycle, which may help the hip of the rider return to an initial position of the hip after rotation, thereby reducing the energy loss of the rider.

Figure 8:
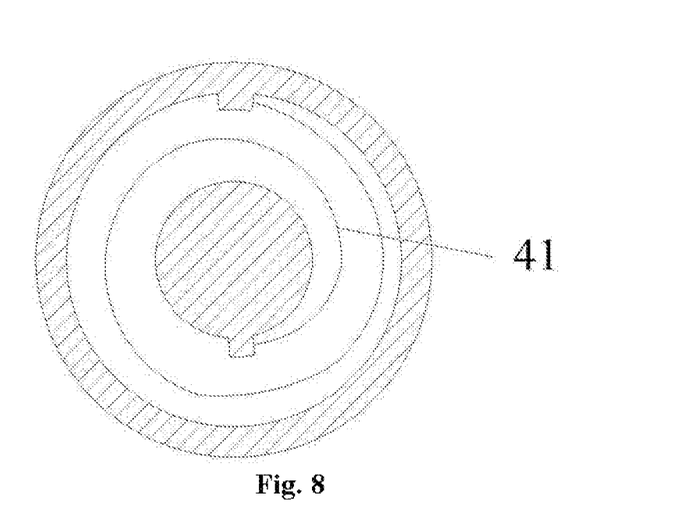
FIG. 8 illustrates a first installation of a elastic return member of a saddle system according to the present disclosure.
Figure 9:
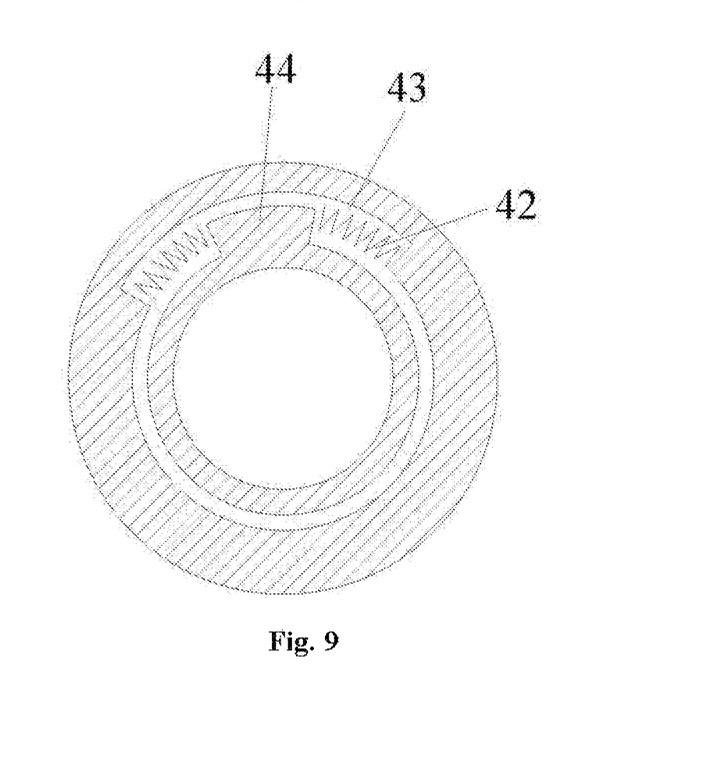
FIG. 9 illustrates a second installation of the elastic return member of the saddle system according to the present disclosure.

In the technical solution of the present disclosure, the mounting manner of the first elastic return member, the second elastic return member, the third elastic return member and the fourth elastic return member can be as shown in FIG. 8, or as shown in FIG. 9. In the manner of FIG. 8, the two relatively rotating parts are returned to their initial position by the hairspring 41. In the manner of FIG. 9, a spring 42 is installed between the two relatively rotating parts, and the two relatively rotating parts are returned to their initial position by the restoring force of the spring 42. In an exemplary embodiment, a spring mounting groove 43 is provided on one part of the two relatively rotating parts, and a cooperate protrusion 44 is provided on the other part of the two relatively rotating parts, and two springs are respectively mounted between the spring mounting groove 43 and the cooperate protrusion 44, so as to achieve the effect of returning to their initial position of the two relatively rotating parts.

The disclosure also provides a bicycle comprising the saddle system described above. By means of the bicycle, the saddle can complete the composite movement of rotation and turnover completely with the hip of the rider, thereby ensuring that the saddle system can move following the hip of the rider completely, reducing the friction between the hip and the saddle, and further avoiding damage to the hip of the rider due to long-time riding of the bicycle.

The foregoing description is merely a preferred embodiment of the present disclosure, and is not intended to limit the present disclosure, and various changes and modifications may be made by those skilled in the art. Any modifications, equivalent replacements and improvements made within the spirit and principle of the present disclosure shall belong to the scope of protection of the present disclosure.

What is claimed is:

1. A saddle system, comprising a follower device, wherein the follower device is arranged on a seat rod of a bicycle for mounting a saddle, and the follower device comprises a left and right rotating assembly and a left and right turnover assembly which are interconnected, wherein the left and right rotating assembly is rotated leftward or rightward with respect to the left and right turnover assembly, so that the saddle rotates leftward or rightward with respect to the seat rod, the left and right turnover assembly is turned over leftward or rightward with respect to the left and right rotating assembly, so that the saddle is turned over leftward or rightward with respect to the seat rod;

Wherein, the left and right rotating assembly is mounted on the seat rod of the bicycle, the left and right turnover assembly is mounted on the left and right rotating assembly, and the saddle is mounted on the left and right turnover assembly.

2. The saddle system according to claim 1, wherein the saddle system further comprises the saddle, the saddle being mounted on the follower device, and left and right sides of the saddle being respectively provided with a thigh avoidance part, a front side of the saddle being provided with an avoidance part for avoiding a private part.

3. The saddle system according to claim 1, wherein the left and right rotating assembly comprises a mounting part and a rotating part, wherein the mounting part is fixedly arranged on the seat rod, the rotating part is rotatablely mounted on the mounting part leftward or rightward, and the left and right turnover assembly is mounted on the rotating part.

4. The saddle system according to claim 3, wherein the left and right turnover assembly comprises a connecting part and a turnover part, and the connecting part is provided on the rotating part, the turnover rotating part is turned over leftward or rightward and mounted on the connecting part, and the saddle is fixedly connected with the turnover part.

5. The saddle system according to claim 3, wherein the left and right rotating assembly further comprises a first elastic return member, the first elastic return member is mounted between the rotating part and the mounting part.

6. The saddle system according to claim 4, wherein the left and right turnover assembly further comprises a second elastic return member, wherein the second elastic return part is mounted between the connecting part and the turnover part.

7. The saddle system according to claim 3, wherein the rotating part comprises a vertical rod and a transverse rod which are connected with each other, wherein the vertical rod is rotatablely mounted on the mounting part, and the left and right turnover assembly is mounted on the transverse rod.

8. The saddle system according to claim 7, wherein the transverse rod is movable forward or backward relative to the vertical rod so as to adjust a position of the saddle (30).

9. The saddle system according to claim 8, wherein an elevation of the transverse rod is adjustably disposed relative to the vertical rod.

10. The saddle system according to claim 9, wherein the rotating part further comprises a locking connecting member, wherein the locking connecting member is connected between the transverse rod and the vertical rod, a transverse groove is provided on the transverse rod, and the locking connecting member comprises a first connecting portion cooperating with the transverse groove; wherein the locking connecting member is provided with a locking state in which the first connecting portion is locked in the transverse groove and an unlocking state in which the first connecting portion is allowed to slide with respect to the transverse groove.

11. The saddle system according to claim 10, wherein an elevation adjusting portion is provided on the vertical rod, and the locking connecting member further comprises a second connecting portion cooperating with the elevation adjusting portion, wherein the locking connecting member adjusts a position of the second connecting portion relative to the elevation adjusting portion to adjust the elevation of the transverse rod, the locking connecting member further locks the second connecting portion on the elevation adjusting portion in the locking state, and the locking connecting member further allows the second connecting portion to move relative to the elevation adjusting portion in the unlocking state.

12. The saddle system according to claim 4, wherein the connecting part is turnover-forwardly mounted on the rotating part.

13. The saddle system according to claim 1, wherein the left and right turnover assembly is used for mounting on a seat tube of a bicycle, wherein the left and right turnover assembly is turned over leftward or rightward with respect to the seat tube, the left and right rotating assembly is mounted on the left and right turnover assembly, and the left and right rotating assembly is rotated leftward or rightward with respect to the left and right turnover assembly, and a mounting portion for mounting the saddle is formed on a top of the left and right rotating assembly.

14. The saddle system according to claim 13, wherein the left and right turnover assembly comprises:
   a connecting part for mounting on the seat tube; and
   a turnover part mounted on the connecting part, wherein the turnover part is turned over leftward or rightward with respect to the connecting part, and the left and right rotating assembly is mounted on the turnover part.

15. The saddle system according to claim 14, wherein the left and right turnover assembly further comprises a turnover transmission part, wherein the turnover transmission part is mounted between the connecting part and the turnover part.

16. The saddle system according to claim 15, wherein the left and right rotating assembly comprises a rotating part and a rotating transmission part, wherein the rotating part is provided on the turnover part and is rotated leftward or rightward with respect to the turnover part, the rotating transmission part is provided between the rotating part and the turnover part, and the mounting portion is formed at a top of the rotating part.

17. The saddle system according to claim 14, wherein the left and right turnover assembly further comprises a third elastic return member, wherein the third elastic return member is mounted between the connecting part and the turnover part.

18. The saddle system according to claim 16, wherein the left and right rotating assembly further comprises a fourth elastic return member, wherein the fourth elastic return member is mounted between the rotating part and the turnover part.

19. A bicycle comprising a saddle system, wherein the saddle system is the saddle system according to claim 1.

* * * * *